United States Patent
Nishihara et al.

(10) Patent No.: US 9,184,867 B2
(45) Date of Patent: Nov. 10, 2015

(54) TRANSMISSION CONTROL DEVICE, TRANSMISSION SYSTEM, AND TRANSMISSION METHOD

(71) Applicant: FUJITSU LIMITED, Kawasaki-shi, Kanagawa (JP)

(72) Inventors: Masato Nishihara, Kawasaki (JP); Tomoo Takahara, Kawasaki (JP); Toshiki Tanaka, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 14/054,290

(22) Filed: Oct. 15, 2013

(65) Prior Publication Data
US 2014/0153925 A1    Jun. 5, 2014

(30) Foreign Application Priority Data
Nov. 30, 2012  (JP) .................. 2012-261905

(51) Int. Cl.
*H04J 14/02*    (2006.01)

(52) U.S. Cl.
CPC ......... *H04J 14/0226* (2013.01); *H04J 14/0298* (2013.01)

(58) Field of Classification Search
CPC  H04J 14/0226; H04J 14/0227; H04J 14/0298
See application file for complete search history.

(56) References Cited

U.S. PATENT DOCUMENTS

| | | | |
|---|---|---|---|
| 2004/0059988 A1* | 3/2004 | Murakami et al. | 714/776 |
| 2004/0233836 A1* | 11/2004 | Sumasu et al. | 370/206 |
| 2005/0135493 A1* | 6/2005 | Maltsev et al. | 375/260 |
| 2007/0263737 A1* | 11/2007 | Li et al. | 375/260 |

FOREIGN PATENT DOCUMENTS

| | | |
|---|---|---|
| JP | 2003-229815 | 8/2003 |
| JP | 2005-295200 | 10/2005 |
| JP | 2006-148797 | 6/2006 |

* cited by examiner

*Primary Examiner* — Dzung Tran
(74) *Attorney, Agent, or Firm* — Staas & Halsey LLP

(57) ABSTRACT

A transmission control device includes a subcarrier selector configured to select one or more subcarriers for transmitting an error correction code for correcting data, from a plurality of subcarriers having different transmission capacities, each of the plurality of subcarriers used for transmitting either of the data and the error correction code, in accordance with an amount of data of the error correction code and transmission capacities respectively assigned to the plurality of subcarriers.

13 Claims, 18 Drawing Sheets

FIG. 6

| SUBCARRIER NUMBER | TRANSMISSION CAPACITY (NUMBER OF BITS) |
|---|---|
| #1 | 6 |
| #2 | 6 |
| #3 | 4 |
| ... | ... |
| #n | 2 |

FIG. 7

| SUBCARRIER NUMBER | TRANSMISSION TARGET |
|---|---|
| #1 | USER DATA |
| #2 | FEC |
| #3 | USER DATA |
| ⋮ | ⋮ |
| #n | USER DATA |

FIG. 11

| SUBCARRIER NUMBER | BER |
|---|---|
| #1 | 10E-15 |
| #2 | 10E-15 |
| #3 | 10E-14 |
| . | . |
| . | . |
| . | . |
| #n | 10E-7 |

TRANSMISSION CONTROL DEVICE, TRANSMISSION SYSTEM, AND TRANSMISSION METHOD

CROSS-REFERENCE TO RELATED APPLICATION

This application is based upon and claims the benefit of priority of the prior Japanese Patent Application No. 2012-261905, filed on Nov. 30, 2012, the entire contents of which are incorporated herein by reference.

FIELD

The embodiments discussed herein are related to a transmission control device, a transmission system, and a transmission method.

BACKGROUND

With a growing demand for communication, optical networks utilizing a wavelength division multiplexing (WDM) technology have become widespread. The WDM technology is a technology in which multiple optical signals each of which has a different wavelength are multiplexed and transmitted. With the WDM technology, for example, multiplexing is performed on optical signals of a transmission rate of 40 Gbps×40 waves, so that a multi-wavelength optical signal of 1.6 Tbps is able to be transmitted.

Examples of a way for error correction in a WDM transmission system include forward error correction (FEC). The FEC exhibits an error correction capability that is in accordance with the redundancy and the code modulation scheme.

As regards the FEC, for example, Japanese Laid-open Patent Publication No. 2003-229815 discloses a WDM transmission system in which FEC data is assigned to wavelength light that is different from that to which main signal data is assigned, and the FEC data is transmitted as an independent signal. With the WDM transmission system, FEC data is not appended to the end of the main signal data. For this reason, it is pointed out that the transmission speed is reduced and the cost of the system is also reduced. Moreover, the WDM transmission system makes it possible to draw a clear distinction between the main signal and the FEC signal. This facilitates the error correction process.

In the WDM transmission system, however, while the transmission capacities of wavelength light are fixed to the same, the amount of FEC data is determined in accordance with the code modulation scheme of FEC and the amount of the main signal data, independently of the transmission capacities of wavelength light. The transmission capacity of the wavelength light assigned to the FEC data is sometimes left over. Accordingly, the above WDM transmission system has a problem in that the transmission efficiency is low.

SUMMARY

According to an aspect of the invention, a transmission control device includes a subcarrier selector configured to select one or more subcarriers for transmitting an error correction code for correcting data, from a plurality of subcarriers having different transmission capacities, each of the plurality of subcarriers used for transmitting either of the data and the error correction code, in accordance with an amount of data of the error correction code and transmission capacities respectively assigned to the plurality of subcarriers.

The object and advantages of the invention will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates example transmission capacity assignment information;

FIG. 7 illustrates example subcarrier selection information;

FIG. 11 is a table illustrating example transmission characteristics information;

DESCRIPTION OF EMBODIMENTS

Figure 1:
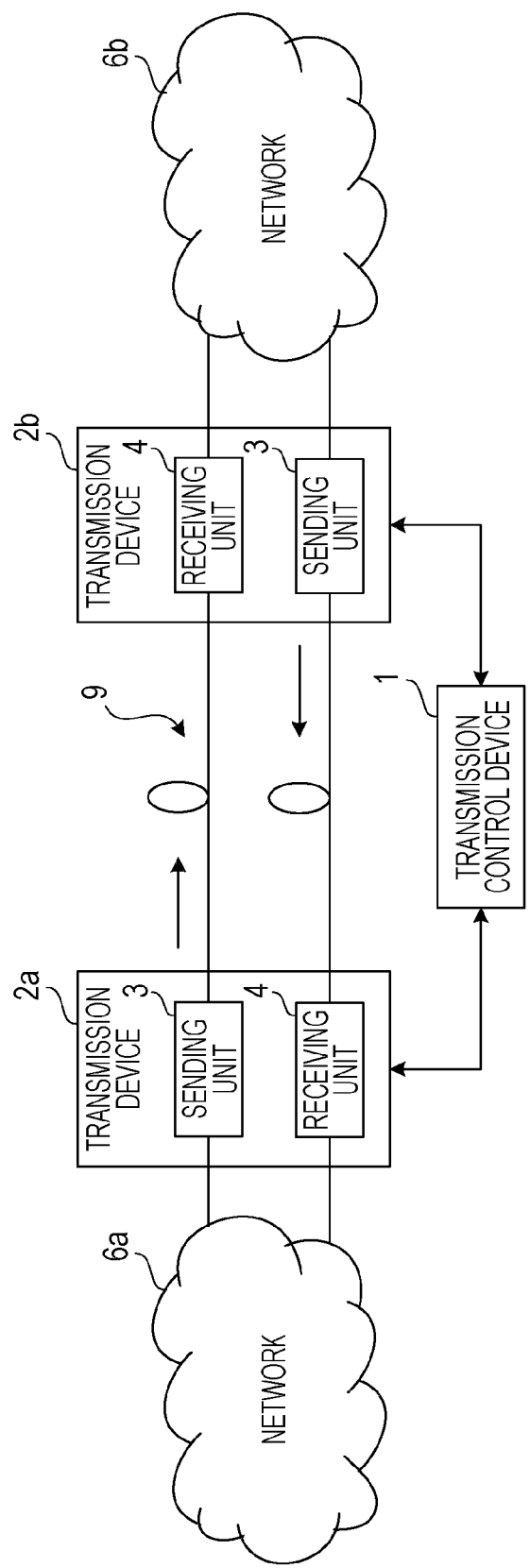
FIG. 1 is a block diagram illustrating a configuration of a transmission system according to an embodiment.

FIG. 1 is a block diagram illustrating a configuration of a transmission system according to an embodiment. The transmission system includes a transmission control device 1 and a pair of transmission devices 2a and 2b. The pair of transmission devices 2a and 2b each include a sending unit 3 that sends signals, and a receiving unit 4 that receives signals. The sending unit 3 of one transmission device 2a or 2b is connected through an individual optical fiber 9 to the receiving unit 4 of the other transmission device 2b or 2a. This allows the pair of transmission devices 2a and 2b to transmit optical signals to each other.

Also, the pair of transmission devices 2a and 2b are connected to external networks 6a and 6b, respectively. Taking the example of an access-type transmission system, one of the networks 6a and 6b is a local area network (LAN) in the home of the user or in an office, and the other is a trunk system network. The sending units 3 send signals received from the network 6a and 6b to the receiving units 4. In contrast, the receiving units 4 send signals received from the sending units 3 to the network 6a and 6b.

The transmission control device 1 is connected to the transmission devices 2a and 2b, and controls the transmission devices 2a and 2b by communicating with the transmission devices 2a and 2b. The transmission control device 1 is a network management device, for example, and is connected through a monitoring control LAN or the like to the transmission devices 2a and 2b. In this case, the transmission control device 1 and the transmission devices 2a and 2b may communicate, for example, using a simple network management protocol (SNMP).

The transmission devices 2a and 2b use a multicarrier transmission scheme in which data signals are superimposed on a plurality of subcarriers (carrier waves) and transmitted in parallel. In this embodiment, examples of a modulation scheme used for the multi carrier transmission scheme include, but are not limited to, a discrete multi-tone (DMT) scheme. One of other modulation schemes is orthogonal frequency division multiplexing (OFDM), which is the base for the DMT scheme.

Figure 2:
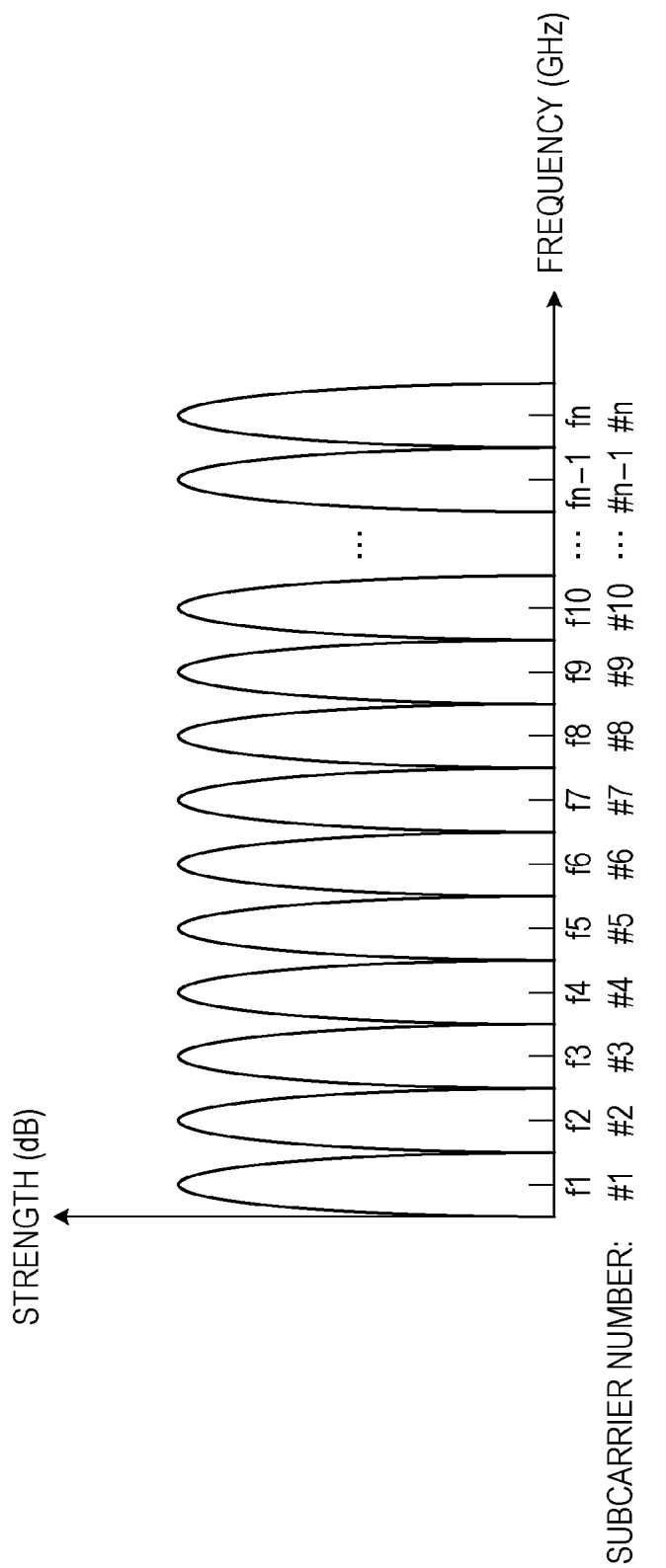
FIG. 2 is a graph illustrating the spectrum for every frequency of a subcarrier.

FIG. 2 is a graph illustrating the spectrum for every frequency of a subcarrier. In FIG. 2, the horizontal axis represents the frequency and the vertical axis represents the strength. The transmission devices 2a and 2b transmit signals of frequencies obtained by dividing a predetermined frequency band (for example, 10 GHz) into n (n being a natural number, for example, 255) frequencies f1 to fn (GHz) at regular frequency intervals, as subcarriers #1 to #n. Note that #1 to #n represent subcarrier numbers for identifying the individual subcarriers.

Figure 3:
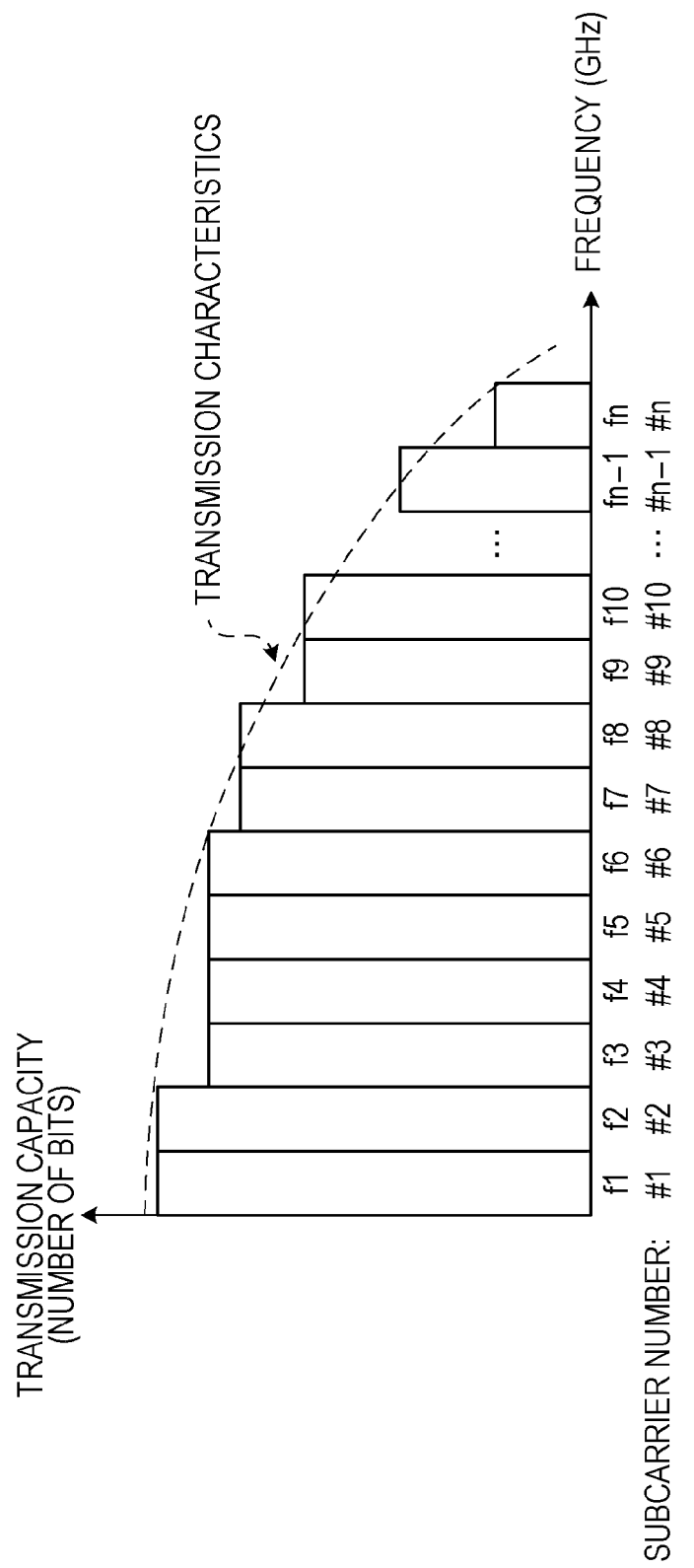
FIG. 3 is a graph illustrating transmission capacities (the number of bits) assigned to individual subcarriers (frequencies)

Individual transmission capacities are assigned to the subcarriers #1 to #n. FIG. 3 is a graph illustrating transmission capacities (the number of bits) assigned to individual subcarriers (frequencies). In FIG. 3, the horizontal axis represents the frequency and the vertical axis represents the transmission capacity. The curve indicated by a dotted line represents the transmission characteristics relative to the frequencies, that is, subcarriers, and indicates that the larger the value of the vertical axis, the better the characteristics.

For the subcarriers #1 to #n, the better the transmission characteristics, the larger the transmission capacity assigned to the subcarrier. Conversely, the poorer the transmission characteristics, the smaller the transmission capacity assigned to the subcarrier. The transmission capacity is the number of bits (the amount of data) with which modulation is performed in one modulation processing in the sending unit 3 of the transmission device 2a or 2b. Accordingly, assignment of transmission capacities to the subcarriers #1 to #n determines individual modulation methods supporting the subcarriers #1 to #n. As such, assignment of transmission capacities depending on the transmission characteristics of the subcarriers #1 to #n may lead to improvement in transmission efficiency.

Figure 4:
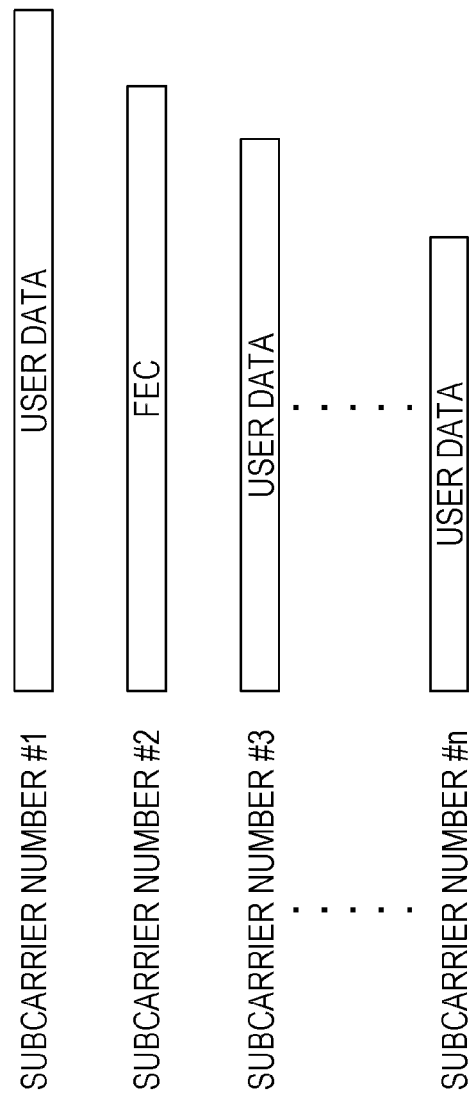
FIG. 4 illustrates example signals transmitted on subcarriers.

FIG. 4 illustrates example signals transmitted on subcarriers #1 to #n. By using the subcarriers #1 to #n, user data and an FEC code, which is an error correction code for correcting the user data, are separately transmitted. Note that, in this embodiment, examples of the error correction code include, but are not limited to, an FEC code.

In the example of FIG. 4, the FEC code is transmitted on the subcarrier #2, and the user data are transmitted on other subcarriers #1, and #3 to #n. The user data transmitted on the subcarriers #1, and #3 to #n are, for example, data contained in a main signal and an operation, administration, and maintenance (OAM) signal, and so forth. The amounts of user data to be transmitted differ depending on the transmission capacities of the subcarriers #1, and #3 to #n.

As such, the user data and the error correction code are superimposed and transmitted on subcarriers different from each other. This makes it possible to draw a clear distinction between the user data and the error correction code, thereby facilitating the error correction process. The subcarriers on which the user data and the error correction code are to be transmitted are selected by the transmission control device 1. Note that although the number of subcarriers for transmitting the FEC code is one in this embodiment, a plurality of subcarriers may be used.

Figure 5:
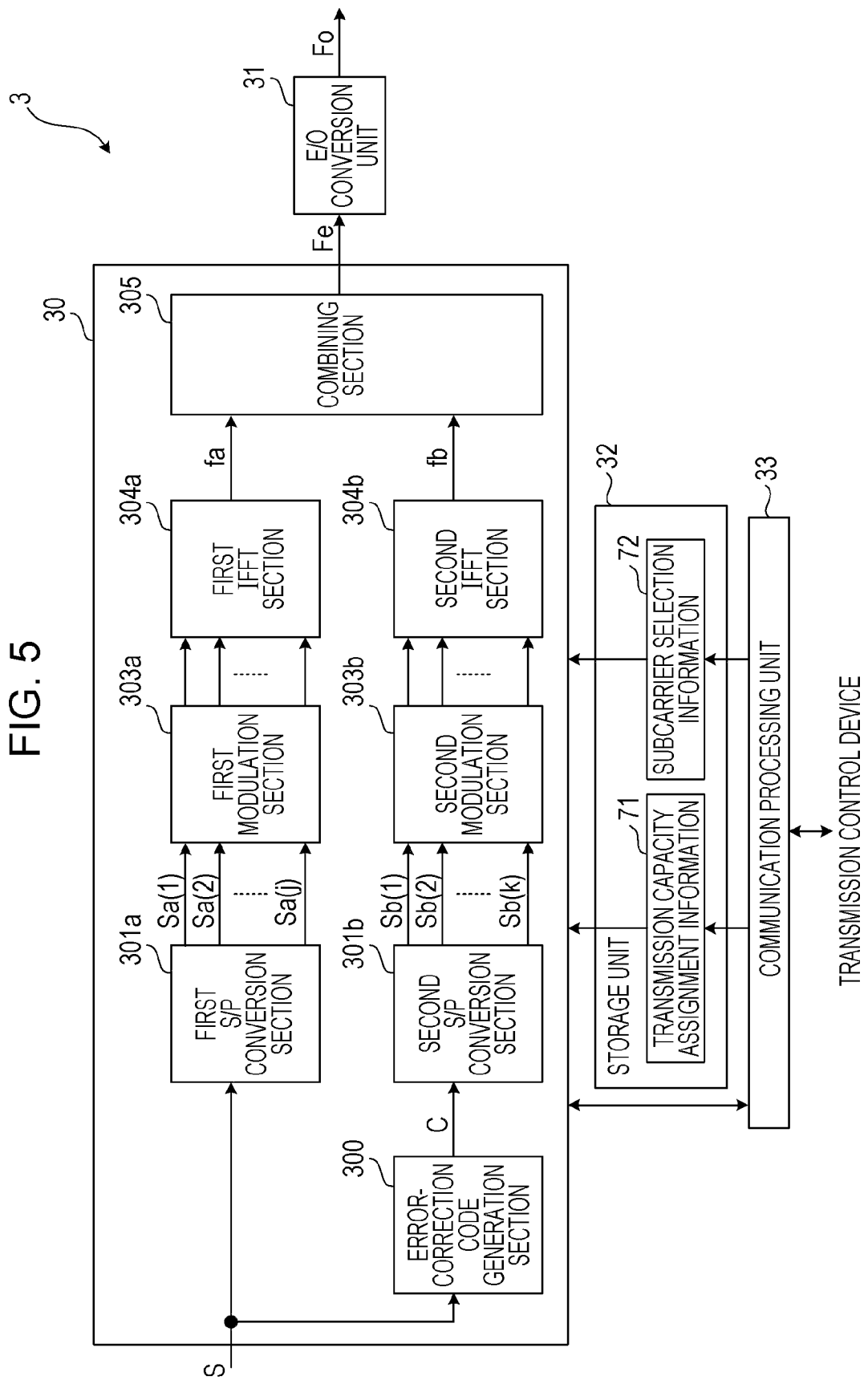
FIG. 5 is a block diagram illustrating a functional configuration of a sending unit of a transmission device.

FIG. 5 is a block diagram illustrating a functional configuration of the sending unit 3 of the transmission device 2a or 2b. The sending unit 3 includes a signal processing unit 30, an electrical-to-optical (E/O) conversion unit 31, a storage unit 32, and a communication processing unit 33.

The signal processing unit 30 processes a data signal S received from the external network 6a or 6b so as to generate an electrical, modulated signal Fe that is superimposed, together with an FEC signal containing an FEC code, on the plurality of subcarriers #1 to #n. The electrical-to-optical conversion unit 31 includes a laser diode, for example, and converts the modulated signal Fe generated by the signal processing unit 30 into an optical signals Fo and outputs the optical signal Fo to the optical fiber 9.

The communication processing unit 33 processes communication with the transmission control device 1. The storage unit 32 is a storing unit such as a memory. The communication processing unit 33 stores transmission capacity assignment information 71 and subcarrier selection information 72, which have been received from the transmission control device 1, in the storage unit 32. The communication processing unit 33 processes direction signals from the transmission control device 1 to the signal processing unit 30.

The signal processing unit 30 reads the transmission capacity assignment information 71 and the subcarrier selection information 72 from the storage unit 32, and performs processing on the basis of the transmission capacity assignment information 71 and the subcarrier selection information 72. FIG. 6 illustrates an example of the transmission capacity assignment information 71. The transmission capacity assignment information 71 indicates transmission capacities (the numbers of bits) for the subcarriers #1 to #n.

Also, FIG. 7 illustrates an example of the subcarrier selection information 72. The subcarrier selection information 72 indicates transmission targets corresponding to the subcarriers #1 to #n, respectively. That is, the subcarrier selection information 72 indicates, for each of the subcarriers #1 to #n, which of the user data and the FEC code is to be transmitted.

The signal processing unit 30 is, for example, an arithmetic processing unit such as a digital signal processor (DSP). The signal processing unit 30 includes an error correction generation section 300, first and second serial-to-parallel (S/P) conversion sections 301a and 301b, and first and second modulation sections 303a and 303b. The signal processing unit 30 further includes first and second inverse fast Fourier transform (IFFT) sections 304a and 304b, and a combining section 305.

The first serial-to-parallel conversion section 301a, the first modulation section 303a, and the first inverse fast Fourier transform section 304a convert the data signal S into a first time signal fa. In contrast, the second serial-to-parallel conversion section 301b, the second modulation section 303b, and the second inverse fast Fourier transform section 304b convert an FEC signal C, which has been generated from the data signal S, into a second time signal fb. Details of the conversion will be described hereinafter.

The data signal S is branched and input to the error correction code generation section 300 and the first serial-to-parallel conversion section 301a. The first serial-to-parallel conversion section 301a performs serial-to-parallel conversion on the data signal S, and divides the data signal S into signals that correspond to user data to be superimposed on the subcarriers #1 to #n, respectively.

Figure 8:
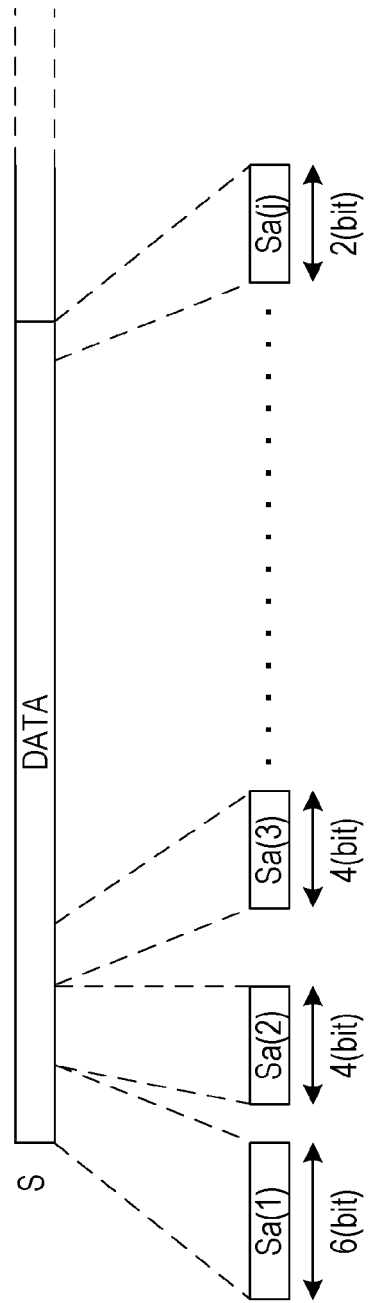
FIG. 8 illustrates a data dividing method to be performed by a first serial-to-parallel conversion section.

FIG. 8 illustrates a data dividing method performed by the first serial-to-parallel conversion section 301a. The first serial-to-parallel conversion section 301a generates data signals Sa (1) to (j) (j being a natural number), which correspond to the subcarriers #1 to #n, respectively, on the basis of the transmission capacity assignment information 71 and the subcarrier selection information 72 from the data signal S input serially. Here, j is the number of subcarriers on which user data is to be transmitted, among a plurality of subcarriers #1 to #n.

More particularly, the first serial-to-parallel conversion section 301a determines subcarriers for transmitting user data, from the subcarrier selection information 72, and acquires the transmission capacities of the determined subcarriers from the transmission capacity assignment information 71, and then generates the data signals Sa (1) to (j). In the examples of FIG. 6 and FIG. 7, the numbers of bits of the data signals Sa (1) to (j) (j=n−1 in this example) match the transmission capacities of the subcarriers #1 and #3 to #n), respectively.

The first serial-to-parallel conversion section 301a outputs the data signals Sa (1) to (j) to the first modulation section 303a. The first modulation section 303a modulates the data signals Sa (1) to (j) using modulation methods depending on the respective numbers of bits. The modulation method is 16-quadrature amplitude modulation (QAM) when the number of bits is four, and the modulation method is 4-QAM when the number of bits is two, for example.

That is, the transmission capacity of each subcarrier is the number of bits (the amount of data) with which modulation is performed in one modulation processing by the first modulation section 303a, and the data signals Sa (1) to (j) are modulated using modulation methods depending on the numbers of bits. Note that examples of the modulation method are not limited to the above QAM, but may include other methods such as phase-shift keying (PSK).

The first modulation section 303a determines subcarriers for transmitting user data, from the subcarrier selection information 72, and performs modulation. The first modulation section 303a outputs the modulated data signals Sa (1) to (j) to the first inverse fast Fourier transform section 304a.

The first inverse fast Fourier transform section 304a performs inverse fast Fourier transformation of the modulated data signals Sa (1) to (j). This causes the data signals Sa (1) to (j) on the axis in the complex plane to be transformed into the first time signal fa on the time axis. At this point, the first inverse fast Fourier transform section 304a determines subcarriers for transmitting user data, from the subcarrier selection information 72, and performs transformations using frequencies corresponding to the determined subcarriers. The first time signal fa is input to the combining section 305.

In contrast, the error correction code generation section 300 generates an FEC code, which is an error correction code for correcting user data contained in the data signal S. The error correction code generation section 300 outputs the generated FEC code as the FEC signal C to the second serial-to-parallel conversion section 301b.

The second serial-to-parallel conversion section 301b performs serial-to-parallel conversion on the FEC signal C, and divides the FEC signal C into signals that correspond to data to be superimposed on the subcarriers #1 to #n, respectively, in a similar way to that of the first serial-to-parallel conversion section 301a.

Figure 9:
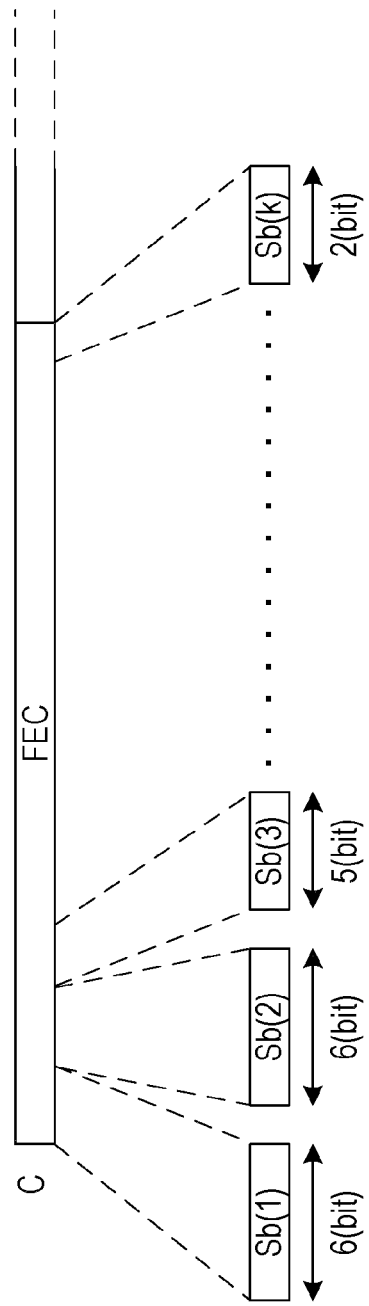
FIG. 9 illustrates an FEC dividing method performed by a second serial-to-parallel conversion section.

FIG. 9 illustrates a data dividing method performed by the second serial-to-parallel conversion section 301b. The second serial-to-parallel conversion section 301b generates code signals Sb (1) to (k) (k being a natural number), which correspond to the subcarriers, respectively, on the basis of the transmission capacity assignment information 71 and the subcarrier selection information 72 from the FEC signal C input serially. Here, k is the number of subcarriers on which an FEC code is to be transmitted, among a plurality of subcarriers #1 to #n.

More particularly, the second serial-to-parallel conversion section 301b determines subcarriers for transmitting an FEC code, from the subcarrier selection information 72, and acquires the transmission capacities of the determined subcarriers from the transmission capacity assignment information 71, and then generates the code signals Sb (1) to (k). Note that, in FIG. 9, as different from in the examples of FIG. 6 and FIG. 7, the case where a plurality of subcarriers are selected as subcarriers for transmitting an FEC code is illustrated. In contrast, in the case where a single subcarrier is selected as in the example of FIG. 6 and FIG. 7, the second serial-to-parallel conversion section 301b generates a single code signal Sb (1).

The second serial-to-parallel conversion section 301b outputs the code signals Sb (1) to (k) to the second modulation section 303b. The second modulation section 303b determines subcarriers for transmitting the FEC code from the subcarrier selection information 72, and modulates the code signals Sb (1) to (k) using modulation methods depending on the respective numbers of bits, as in the first modulation section 303a. The second modulation section 303b outputs the modulated code signals Sb (1) to (k) to the second inverse fast Fourier transform section 304b.

The second inverse fast Fourier transform section 304b performs inverse fast Fourier transformations of the modulated code signals Sb (1) to (k) on the basis of the subcarrier selection information 72, as in the first inverse fast Fourier transform section 304a. This causes the code signals Sb (1) to (k) on the axis in the complex plane to be transformed into the second time signal fb on the time axis. At this point, the second inverse fast Fourier transform section 304b determines subcarriers for transmitting the FEC code, from the subcarrier selection information 72, and performs transformations using frequencies corresponding to the determined subcarriers. The second time signal fb is input to the combining section 305.

The combining section 305 combines together the first and second time signals fa and fb input from the first and second inverse fast Fourier transform sections 304a and 304b, respectively. The combining section 305 performs a combining process by performing frequency modulation based on the subcarrier selection information 72. Thereby, the data signal S and the FEC signal C are superimposed on time signals corresponding to the subcarriers #1 to #n. The modulated signal Fe obtained by the combining process is converted into the optical signal Fo by the electrical-to-optical conversion unit 31 and is output to the optical fiber 9, and then is received by the receiving unit 4 of the opposing transmission device 2a or 2b.

Figure 10:
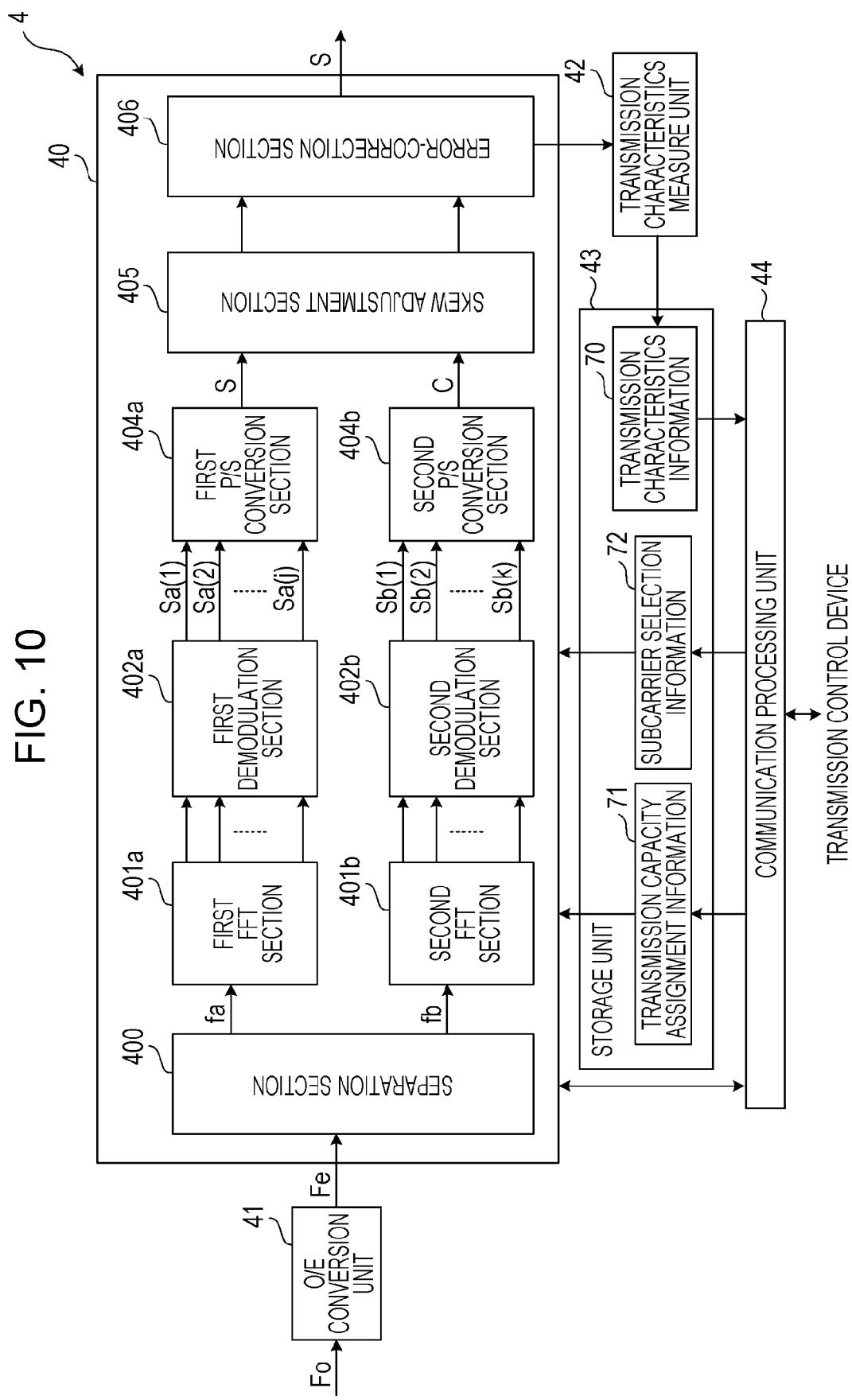
FIG. 10 is a block diagram illustrating a functional configuration of a receiving unit of the transmission device.

FIG. 10 is a block diagram illustrating a functional configuration of the receiving unit 4 of the transmission device 2a or 2b. The receiving unit 4 includes a signal processing unit 40, an optical-to-electrical (O/E) conversion unit 41, a transmission characteristics measurement unit 42, a storage unit 43, and a communication processing unit 44.

The optical-to-electrical conversion unit 41 includes a photodiode, for example, and converts the optical signal Fo, which has been input through the optical fiber 9, into the electrical, modulated signal Fe and outputs the modulated signal Fe to the signal processing unit 40. The signal processing unit 40 processes the modulated signal Fe to generate the original data signal S. The generated data signal S is sent to the external network 6a or 6b.

The communication processing unit 44 processes communication with the transmission control device 1. The storage unit 43 is a storing unit such as a memory. The communication processing unit 44 stores the transmission capacity assignment information 71 and the subcarrier selection information 72, which have been received from the transmission control device 1, and transmission characteristics information 70, which has been input from the transmission characteristics measurement unit 42, in the storage unit 43. The communication processing unit 43 processes direction signals from the transmission control device 1 to the signal processing unit 40, and so forth. Note that, instead of the communication processing unit 44, the communication processing unit 33 of the sending unit 3 provided in the same transmission device 2a or 2b may be used.

The signal processing unit 40 reads the transmission capacity assignment information 71 and the subcarrier selection information 72 from the storage unit 43, and performs processing on the basis of the transmission capacity assignment information 71 and the subcarrier selection information 72. The transmission capacity assignment information 71 and the subcarrier selection information 72 are as described with reference to FIG. 6 and FIG. 7.

The signal processing unit 40 is an arithmetic processing unit such as a DSP, for example. The signal processing unit 40 includes a separation section 400, first and second fast Fourier transform (FFT) sections 401a and 401b, and first and second demodulation sections 402a and 402b. The signal processing unit 40 further includes first and second parallel-to-serial (P/S) conversion sections 404a and 404b, a skew adjustment section 405, and an error correction section 406.

The separation section 400 separates the modulated signal Fe into the first and second time signals fa and fb by performing filtering of frequency components on the basis of the subcarrier selection information 72. The first and second time signals fa and fb are input to the first and second fast Fourier transform sections 401a and 401b, respectively.

The first fast Fourier transform section 401a, the first demodulation section 402a, and the first parallel-to-serial conversion section 404a convert the first time signal fa into the data signal S. In contrast, the second fast Fourier transform section 401b, the second demodulation section 402b, and the second parallel-to-serial conversion section 404b convert the second time signal fb to the FEC signal C. Details of the conversion will be described hereinafter.

The first fast Fourier transform section 401a transforms the first time signal fa on the time axis into the data signals Sa (1) to (j) on the axis in the complex plane by performing a fast Fourier transformation. At this point, the first fast Fourier transform section 401a determines subcarriers for transmitting user data, from the subcarrier selection information 72, and performs conversion using frequencies corresponding to the determined subcarriers. The data signals Sa (1) to (j) are input to the first demodulation section 402a.

The first demodulation section 402a demodulates each of the data signals Sa (1) to (j) on the basis of the transmission capacity assignment information 71 and the subcarrier selection information 72. The first demodulation section 402a determines subcarriers for transmitting user data, from the subcarrier selection information 72, and acquires the transmission capacities of the determined subcarriers from the transmission capacity assignment information 71. Then, the first demodulation section 402a demodulates the data signals Sa (1) to (j) using demodulation methods depending on the respective numbers of bits. The demodulated data signals Sa (1) to (j) are input to the first parallel-to-serial conversion section 404a.

The first parallel-to-serial conversion section 404a develops the demodulated data signals Sa (1) to (j) depending on the respective numbers of bits on the basis of the transmission capacity assignment information 71 and the subcarrier selection information 72, thereby generating the data signal S. The data signal S is input to the skew adjustment section 405.

In contrast, the second fast Fourier transform section 401b transforms the second time signal fb on the time axis into the code signals Sb (1) to (k) on the axis in the complex plane by performing a fast Fourier transformation. At this point, the second fast Fourier transform section 401b determines subcarriers for transmitting the FEC code from the subcarrier selection information 72, and performs conversion using frequencies corresponding to the determined subcarriers. The code signals Sb (1) to (k) are input to the second demodulation section 402b. Note that, in the case where the FEC code is transmitted by using a single subcarrier, a single code signal Sb (1) is input.

Like the first demodulation section 401a, the second demodulation section 402b demodulates each of the code signals Sb (1) to (k) on the basis of the transmission capacity assignment information 71 and the subcarrier selection information 72. Like the first parallel-to-serial conversion section 404a, the second parallel-to-serial conversion section 404b develops the demodulated data signals Sb (1) to (k) depending on the respective numbers of bits on the basis of the transmission capacity assignment information 71 and the subcarrier selection information 72, thereby generating the FEC signal C. The FEC signal C is input to the skew adjustment section 405.

The skew adjustment section 405 adjust the skew between the data signal S input from the first parallel-to-serial conversion section 404a and the FEC signal C input from the second parallel-to-serial conversion section 404b. The data signal S and the FEC signal C between which the skew has been adjusted are input to the error correction section 406.

The error correction section 406 corrects errors of data on the data signal S using the FEC code contained in the FEC signal C. At this time, the number of bits that are able to be corrected is determined depending on the redundancy of the FEC code. In this embodiment, the FEC code is processed as an FEC signal different from the data signal S containing user data, and therefore is clearly distinguished from the user data. This facilitates the error correction process. Note that the corrected data signal S is sent to the external network 6a or 6b.

The transmission characteristics measurement unit 42 acquires the data signal S before error correction from the error correction section 406 and measures the transmission characteristics. Examples of the transmission characteristics to be measured include, but are not limited to, a bit error rate (BER). The data of the data signal S for use in measurement may be random pattern data such as a psedorandom binary sequence (PRBS), for example. Note that the data signal S for use in measurement will be referred to as a "measurement signal" hereinafter.

The transmission characteristics are measured for each subcarrier on the basis of a direction from the transmission control device 1, for example, at the time of start-up of the transmission system. The transmission characteristics measurement unit 42 generates the transmission characteristics information 70 indicating the measured transmission characteristics and stores the transmission characteristics information 70 in the storage unit 43.

FIG. 11 is a table illustrating an example of the transmission characteristics information 70. The transmission characteristics information 70 lists the numerical values of bit error rates of the subcarriers #1 to #n. The transmission characteristics information 70 is used for processing of generating the transmission capacity assignment information 71 in the transmission control device 1. The communication processing unit 44 reads the transmission characteristics information 70 in the storage unit 43 and sends the read transmission characteristics information 70 to the transmission control device 1.

Figure 12:
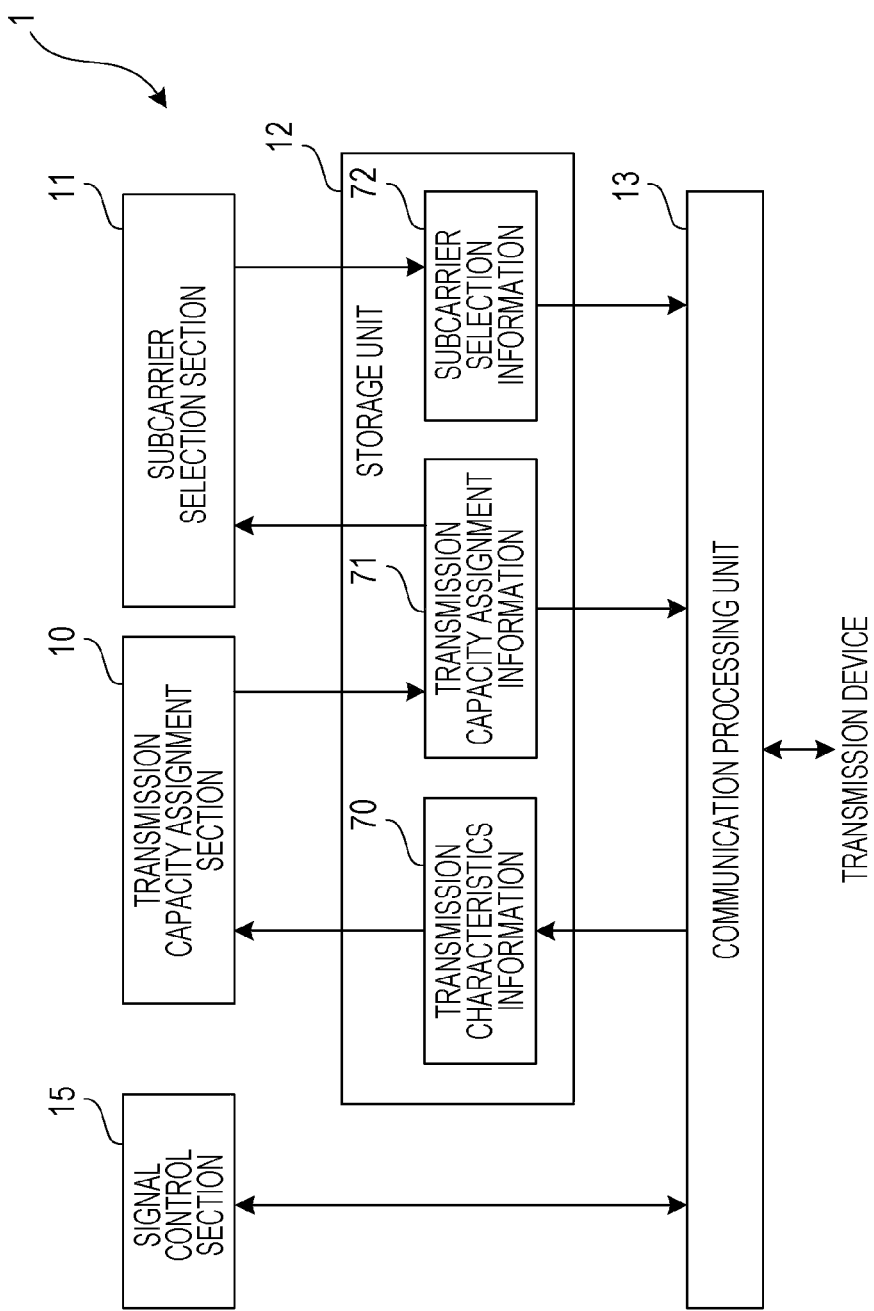
FIG. 12 is a block diagram illustrating a functional configuration of a transmission control device according to the embodiment.

FIG. 12 is a block diagram illustrating a functional configuration of the transmission control device 1 according to the embodiment. The transmission control device 1 includes a transmission capacity assignment section 10, a subcarrier selection section 11, a storage unit 12, a communication processing unit 13, and a signal control section 15. Here, the transmission capacity assignment section 10, the subcarrier selection section 11, the signal control section 15, and the communication processing unit 13 correspond to an arithmetic processing unit such as a central processing unit (CPU), and the storage unit 12 is a storing unit such as a memory.

The communication processing unit 13 processes communication with the transmission device 2a or 2b. The communication processing unit 13 receives the transmission characteristics information 70 from the transmission device 2a or 2b and stores the transmission characteristics information 70 in the storage unit 12.

The transmission capacity assignment section 10 respectively assigns transmission capacities to the plurality of subcarriers #1 to #n for separately transmitting user data and an FEC code, which is an error correction code for correcting the user data. As mentioned with reference to FIG. 3, the transmission capacity assignment section 10 assigns transmission capacities to the plurality of subcarriers #1 to #n depending on the transmission characteristics of the plurality of subcarriers #1 to #n, respectively. The transmission characteristics are obtained from the transmission characteristics information 70 in the storage unit 12. The transmission capacity assignment section 10 generates the transmission capacity assignment information 71 on the basis of the result of the assignment and stores the transmission capacity assignment information 71 in the storage unit 12.

The subcarrier selection section 11 selects one or more subcarriers for transmitting an FEC code from the plurality of subcarriers #1 to #n in accordance with the amount (length) of data of the FEC code and the transmission capacities assigned to the plurality of subcarriers #1 to #n by the transmission capacity assignment section 10. In this way, subcarriers are selected so that the unassigned portion of the transmission capacities is as small as possible, depending on the amount of data of the FEC code. This improves the transmission efficiency. The subcarrier selection section 11 generates the subcarrier selection information 72 on the basis of the result of selection, and stores the subcarrier selection information 72 in the storage unit 12. Note that, it is assumed in this embodiment that the amount of data of the FEC code has a determined value.

The communication processing unit 13 reads the transmission capacity assignment information 71 and the subcarrier selection information 72 in the storage unit 12 and sends them to the transmission device 2a or 2b. Thus, the transmission control device 1 sets the transmission capacity assignment information 71 and the subcarrier selection information 72 to the transmission device 2a or 2b.

Also, the signal control section 15 communicates through the communication processing unit 13 with the transmission device 2a or 2b. The signal control section 15 directs the transmission device 2a or 2b to perform measurement of transmission characteristics and start transmission processing.

Figure 13:
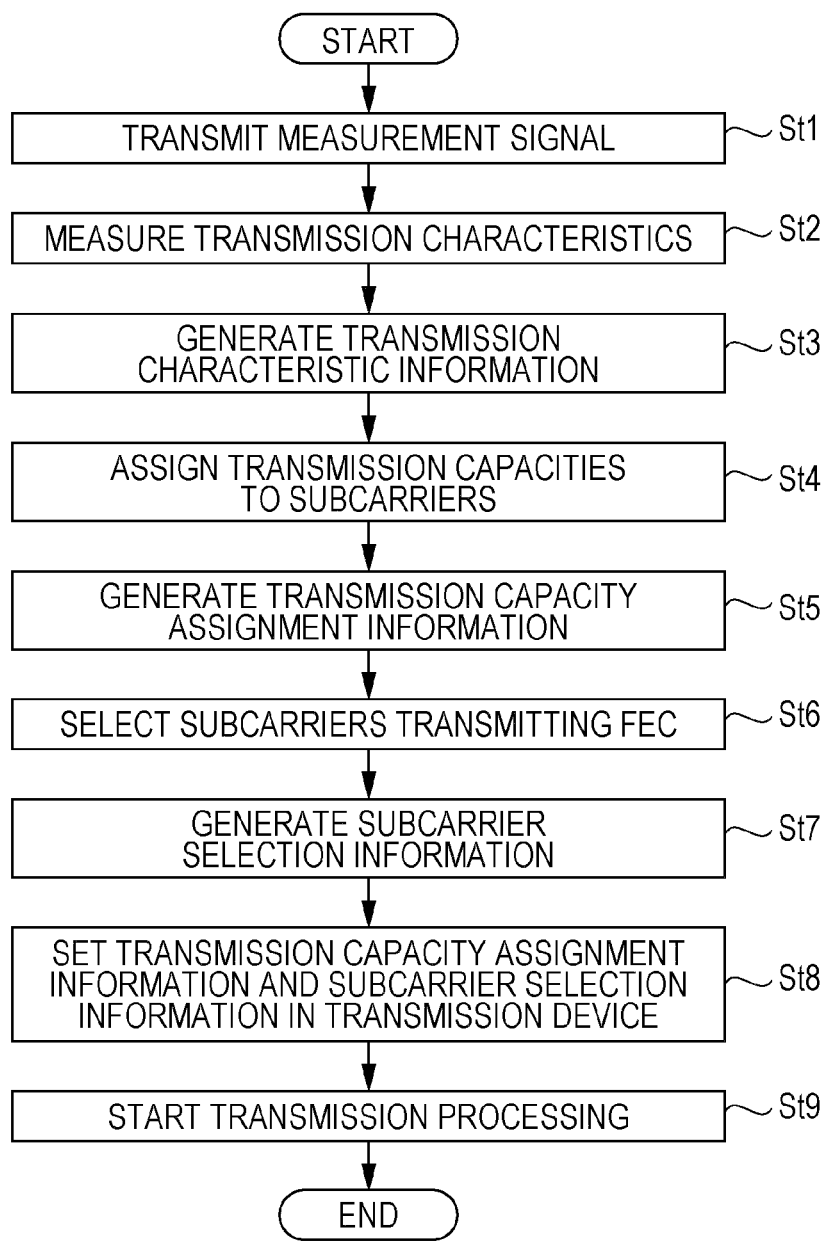
FIG. 13 illustrates the flow of a transmission method according to the embodiment.

FIG. 13 illustrates the flow of a transmission method according to this embodiment. First, following a direction from the signal control section 15, the transmission device 2a or 2b transmits a measurement signal for measurement of transmission characteristics (St1). Note that, in the measurement, the transmission capacities assigned to subcarriers might be fixed.

Then, the transmission characteristics measurement unit 42 measures transmission characteristics on the basis of the measurement signal (St2). Then, the transmission characteristics measurement unit 42 generates the transmission characteristics information 70 in accordance with the measurement result (St3). The generated transmission characteristics information 70 is transmitted to the transmission control device 1 by the communication processing unit 44.

Then, the transmission capacity assignment section 10 respectively assigns transmission capacities to the plurality of subcarriers #1 to #n for separately transmitting user data and an FEC code, which is an error correction code for correcting the user data (St4). The transmission capacities are assigned on the basis of the transmission characteristics information 70 as described above. Then, the transmission capacity assignment section 10 generates the transmission capacity assignment information 71 on the basis of the assignment result (St5). The generated transmission capacity assignment information 71 is stored in the storage unit 12.

Then, the subcarrier selection section 11 selects one or more subcarriers for transmitting the FEC code, from the plurality of subcarriers #1 to #n, in accordance with the amount of data of the FEC code and the transmission capacities respectively assigned to the plurality of subcarriers #1 to #n (St6). The selection methods will be described later with reference to FIG. 14 to FIG. 16. Then, the subcarrier selection section 11 generates the subcarrier selection information 72 based on the selection result (St7). The generated subcarrier selection information 72 is stored in the storage unit 12.

Then, the communication processing unit 13 sends and sets the transmission capacity assignment information 71 and the subcarrier selection information 72 in the storage unit 12 to the transmission device 2a or 2b (St8). Then, the signal control section 15 directs the transmission device 2a or 2b to start transmission processing (St9). Thus, the transmission device 2a or 2b superimposes and transmits the user data and the FEC code on the plurality of subcarriers #1 to #n in accordance with the assignment contents indicated by the transmission capacity assignment information 71 and the selection contents indicated by the subcarrier selection information 72.

Figure 14:
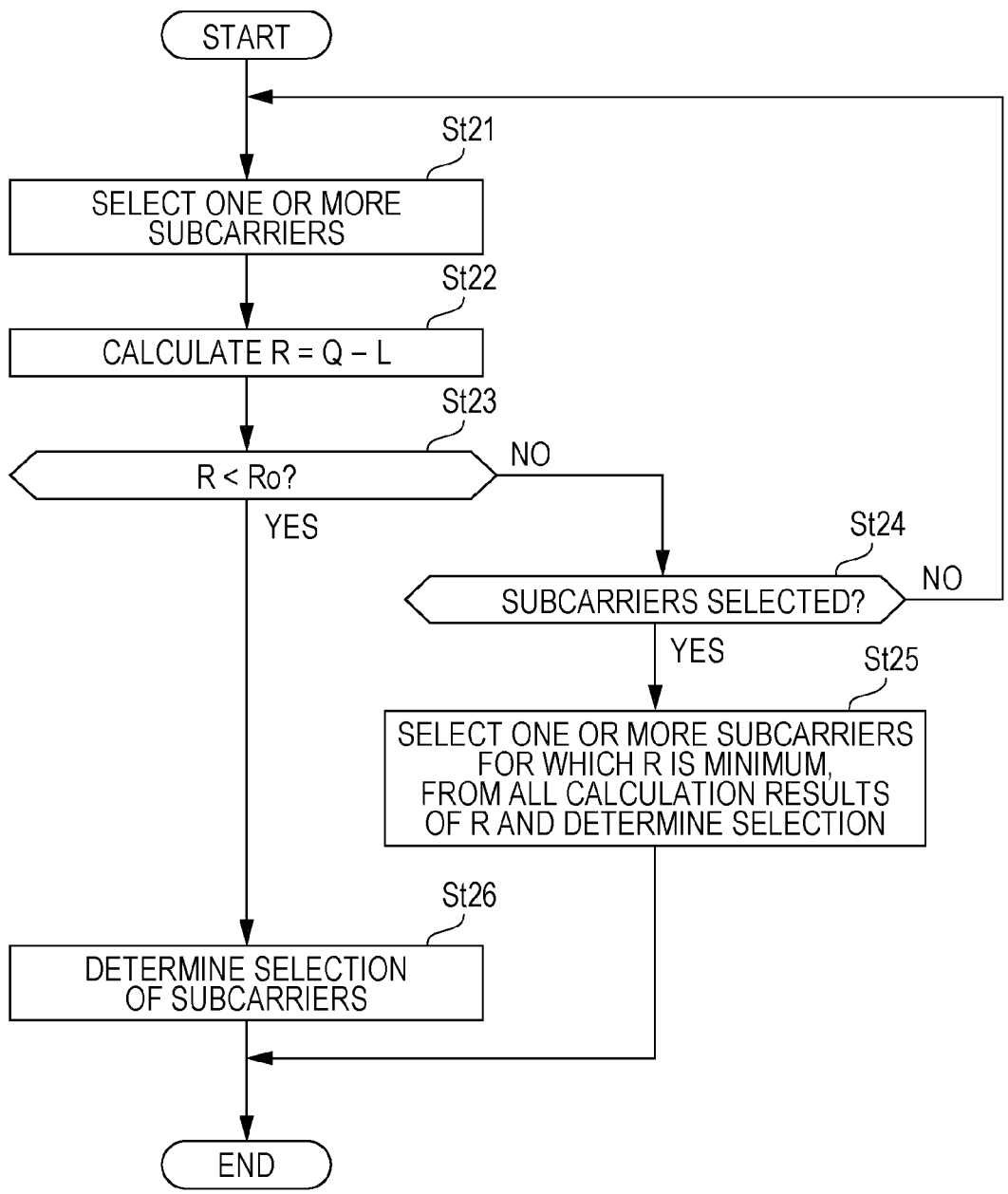
FIG. 14 illustrates the flow of an example of processing of a subcarrier selection section.

FIG. 14 illustrates the flow of an example of processing (St7 mentioned above) of the subcarrier selection section 11. First, the subcarrier selection section 11 selects one or more subcarriers (St21).

$$R = Q - L \tag{1}$$

Then, according to the above equation (1), the subcarrier selection section 11 calculates the remainder R of the transmission capacities that occurs when the FEC code is transmitted, for the selected one or more subcarriers (St 22). Here, a numerical value Q is the total sum of transmission capacities of the selected subcarriers acquired from the transmission capacity assignment information 71, and a numerical value L is the amount of data of the FEC code.

Figure 15:
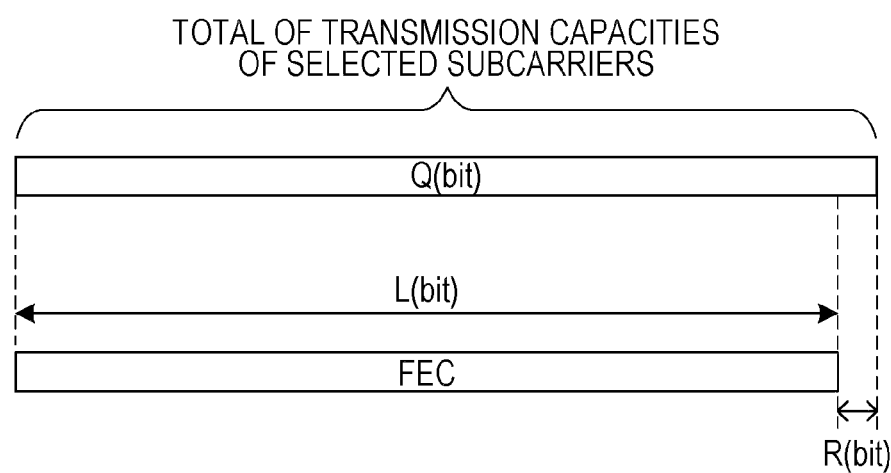
FIG. 15 illustrates the remainder of the transmission capacities that occurs when an FEC code is transmitted.

FIG. 15 illustrates the remainder R of the transmission capacities that occurs when the FEC code is transmitted. When the FEC code is transmitted by using one or more subcarriers, the remainder R of the transmission capacities is obtained by equation (1).

Then, the subcarrier selection section 11 compares the remainder R calculated in St22 with a given value Ro (St23). If the result of comparison is that the remainder R<Ro (YES in St23), the subcarrier selecting section 11 determines selection of one or more subcarriers as subcarriers for transmitting the FEC code (St26). At this point, other subcarriers are selected as subcarriers for transmitting the user data. After the processing of St26, the subcarrier selection section 11 completes the process.

In this way, the subcarrier selection section 11 selects subcarriers for which the remainder R of transmission capacities is smaller than the given value Ro, among the plurality of subcarriers #1 to #n. Accordingly, it is possible for the subcarrier selection section 11 to select subcarriers for transmitting the FEC code in a short period of time without calculating the remainder R of the transmission capacities for all the subcarriers #1 to #n.

Otherwise, if the result of comparison in St23 is that the remainder R>=Ro (NO in St23), the subcarrier selection section 11 determines whether the subcarriers used for transmission (including all the combinations of one or more subcarriers) have been selected (St24). If the result of determination is that all the subcarriers have not been selected (NO in St24), the subcarrier selection section 11 performs again the processing of St21. At this point, the subcarrier selection section 11 selects one or more subcarriers that have not yet been selected.

Otherwise, if the result of determination is that all the subcarriers have been selected (YES in St24), the subcarrier selection section 11 selects one or more subcarriers for which the remainder R of the transmission capacities is minimized, as subcarriers for transmitting the FEC code, from all the previous calculation results of the remainder R, and determines the selection (St25). At this point, other subcarriers are selected as subcarriers for transmitting the user data. After the processing of St25, the subcarrier selection section 11 completes the process.

As such, if subcarriers for which the remainder R of the transmission capacities is smaller than the given value Ro when the FEC code is transmitted do not exist, the subcarrier selection unit 11 selects subcarriers for which the remainder R of the transmission capacities is minimized, among the plurality of subcarriers #1 to #n. Accordingly, the subcarrier selection section 11 may select subcarriers even if appropriate subcarriers that can realize R<R0 do not exist. Minimization of the remainder R causes transmission capacities increase and more efficiently transmission is achieved.

In such a way, the subcarrier selection section 11 selects subcarriers for transmitting the FEC code from the plurality of subcarriers #1 to #n. In the example of FIG. 14, if appropriate subcarriers do not exist, the subcarrier selection section 11 selects subcarriers for which the remainder R of the transmission capacities is minimized. However, the subcarrier selection section 11 may select subcarriers for which the remainder R of the transmission capacities is minimized, regardless of the presence or absence of appropriate subcarriers.

Figure 16:
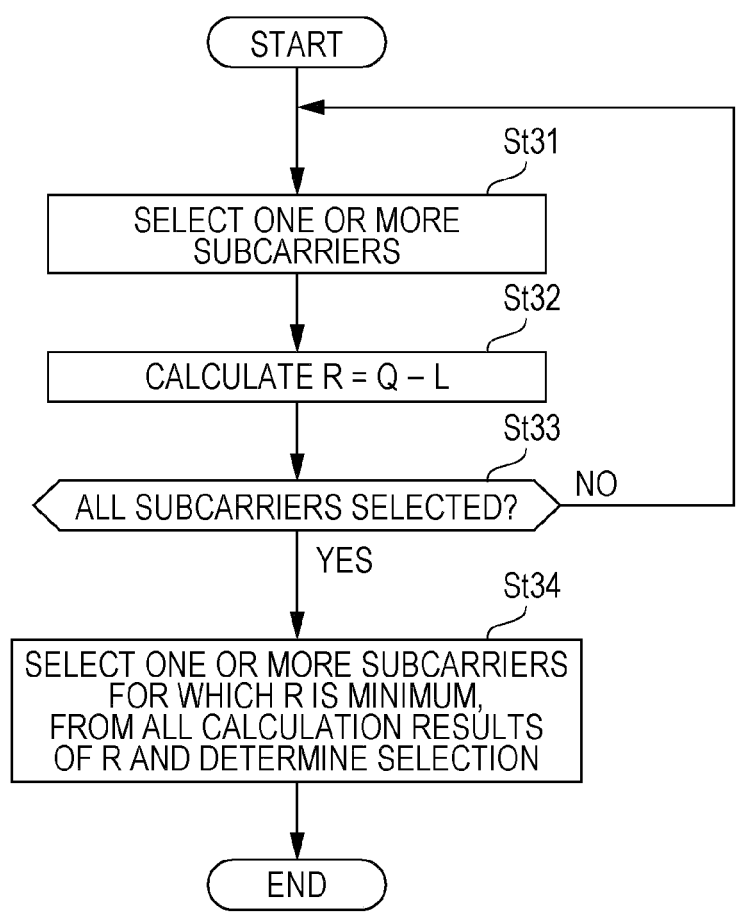
FIG. 16 illustrates the flow of another example of processing of the subcarrier selection section.

FIG. 16 illustrates the flow of another example of the processing of the subcarrier selection section 11. First, the subcarrier selection section 11 selects one or more subcarriers (St31).

Then, as in the processing of St22, according to the above equation (1), the subcarrier selection section 11 calculates the remainder R of the transmission capacities that occurs when the FEC code is transmitted, for the selected one or more subcarriers (St 32). Then, the subcarrier selection section 11 determines whether all the subcarriers (including all the combinations of one or more subcarriers) have been selected (St33).

If the result of determination is that all the subcarriers have not been selected (NO in St33), the subcarrier selection section 11 performs again the processing of St31. At this point, the subcarrier selection section 11 selects one or more subcarriers that have not yet been selected.

Otherwise, if the result of determination is that the subcarriers used for transmission have been selected (YES in St33), the subcarrier selection section 11 selects one or more subcarriers for which the remainder R of the transmission capacities is minimized, as subcarriers for transmitting the FEC code, from all the previous calculation results of the remainder R, and determines the selection (St34). At this point, other subcarriers are selected as subcarriers for transmitting the user data. After the processing of St34, the subcarrier selection section 11 completes the process.

In such a way, the subcarrier selection section 11 selects subcarriers for transmitting the FEC code from the plurality of subcarriers #1 to #n. In the example of FIG. 16, the subcarrier selection section 11 selects one or more subcarriers for which the remainder R of the transmission capacities is minimized when the FEC code is transmitted, among the plurality of subcarriers #1 to #n. Accordingly, subcarriers are selected as the subcarriers for transmitting the FEC code in such a way as to achieve the highest transmission efficiency.

As described above, the plurality of subcarriers #1 to #n differ from one another in transmission capacity, and either of user data and an FEC code, which is an error correction code for correcting the user data, is transmitted on each of the plurality of subcarriers #1 to #n. The subcarrier selection section 11 selects one or more subcarriers for transmitting the FEC code from the plurality of subcarriers #1 to #n, in accordance with the amount of data of the FEC and the transmission capacities respectively assigned to the plurality of subcarriers #1 to #n.

In the transmission control device 1 according to the embodiment, transmission capacities are assigned to the plurality of subcarriers #1 to #n, respectively. Unlike the WDM scheme in which the transmission capacity of each wavelength signal is fixed, the transmission capacities of the subcarriers #1 to #n differ. Additionally, the subcarrier selection section 11 selects subcarriers in accordance with the amount of data of the FEC code and the transmission capacities. Accordingly, subcarriers for transmitting the FEC code may be selected so that the unassigned portion of the transmission capacities is as small as possible, depending on the amount of data of the FEC code. This improves the transmission efficiency.

Additionally, the transmission system according to the embodiment includes the transmission control device 1 and the transmission devices 2a and 2b. The transmission devices 2a and 2b superimpose and transmit the user data and the FEC code on the plurality of subcarriers #1 to #n in accordance with the selection of the subcarrier selection section 11. Accordingly, with the transmission system according to the embodiment, the same actions and effects as with the transmission control device 1 are obtained.

Moreover, with a transmission method according to the embodiment, one or more subcarriers for transmitting the FEC code are selected from the plurality of subcarriers #1 to #n having different transmission capacities, in accordance with the amount of data of the FEC code and the assigned transmission capacities. Each of the subcarriers #1 to #n is to be used for transmitting either of user data and the FEC code for correcting the user data. Then, in accordance with the selection, the user data and the FEC code are superimposed and transmitted on the plurality of subcarriers #1 to #n. Accordingly, with the transmission method according to the embodiment, the same actions and effects as with the transmission control device 1 are obtained.

Figure 17:
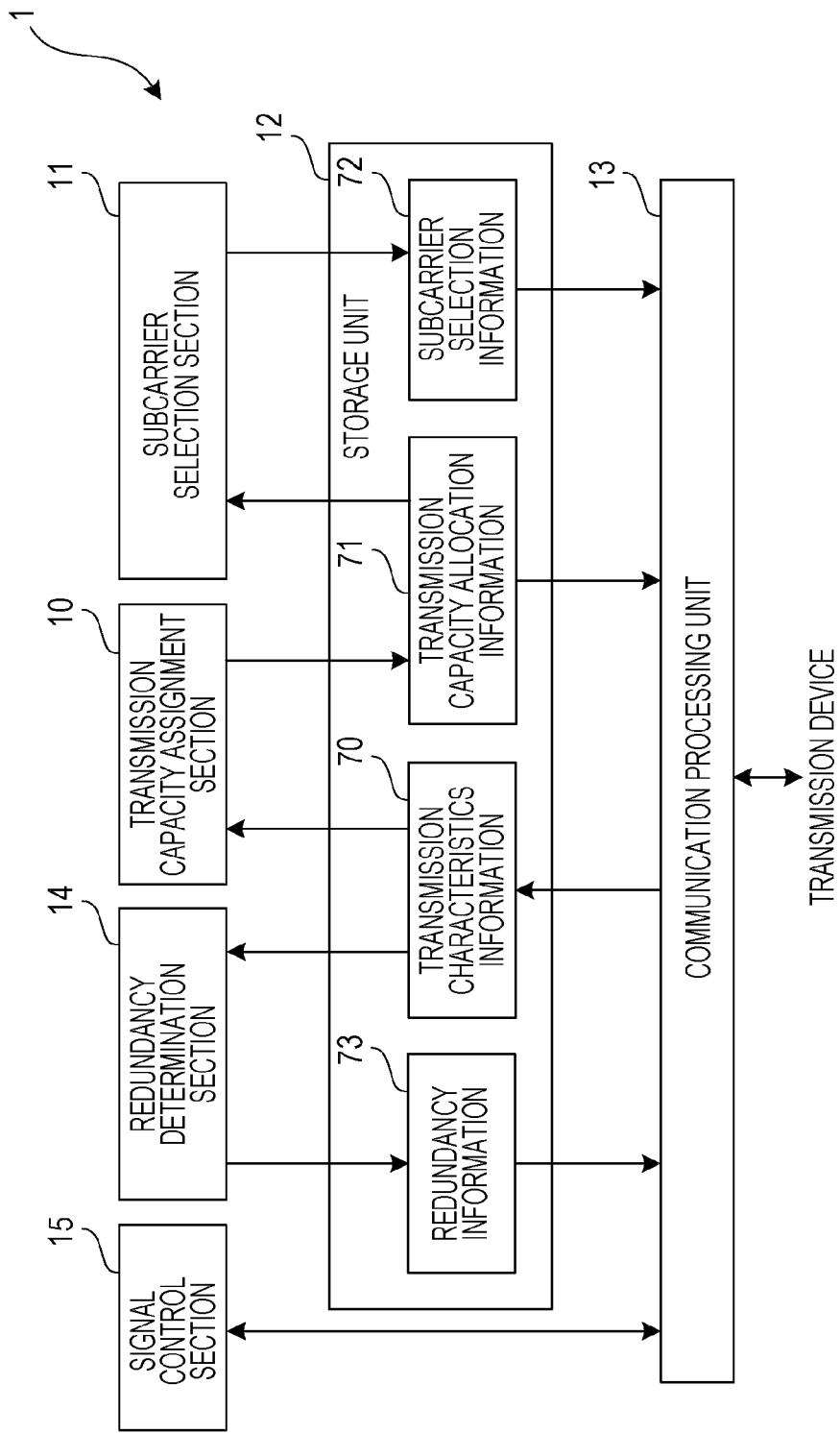
FIG. 17 is a block diagram illustrating a functional configuration of a transmission control device according to another embodiment.

Although it is assumed in this embodiment that the amount of data of the FEC code has a predetermined value, the amount of data of the FEC is not limited to this and may be determined depending on the transmission capacities of the plurality of subcarriers #1 to #n. FIG. 17 is a block diagram illustrating a functional configuration of the transmission control device 1 according to another embodiment. In FIG. 17, the same configuration components as those in FIG. 12 are denoted by the same reference characters, and the description is omitted.

The transmission control device 1 includes the transmission capacity assignment section 10, the subcarrier selection section 11, the storage unit 12, the communication processing unit 13, a redundancy determination section 14, and the signal control section 15. The redundancy determination section 14 determines the redundancy of the FEC code depending on the transmission characteristics of the plurality of subcarriers #1 to #n. The transmission characteristics of the plurality of subcarriers #1 to #n are acquired from the transmission characteristics information 70 described above.

The redundancy of the FEC code is a parameter that affects the error correction capability of the FEC code. Depending on the redundancy of the FEC code, the ratio of the amount of data of the FEC code to the amount of data of the user data is determined, for example. That is, the redundancy determination section 14 determines the amount of data of the FEC code depending on the transmission characteristics of the plurality of subcarriers #1 to #n.

The redundancy determination section 14 stores the ratio or the amount of data of the FEC code obtained on the basis of the ratio, as redundancy information 73, in the storage unit 12. The communication processing unit 13 sends the redundancy information 73 in the storage unit 12 to the transmission devices 2a and 2b.

In the transmission devices 2a and 2b, the redundancy information 73 is set to the signal processing units 30 and 40, respectively. Thereby, the error correction code generation section 300 generates the FEC code having the data amount depending on the redundancy information 73. In contrast, the error correction section 406 performs an error correction process in accordance with the redundancy information 73. Note that the redundancy information 73 may be stored through the communication processing units 33 and 44 in the storage units 32 and 43, respectively.

The changes in the redundancy of the FEC code are made in response to variations in the external environments of the transmission system, for example. Examples of the variations in the external environments include events having influence on the transmission characteristics, such as temperature changes and replacement of the optical fiber 9.

Figure 18:
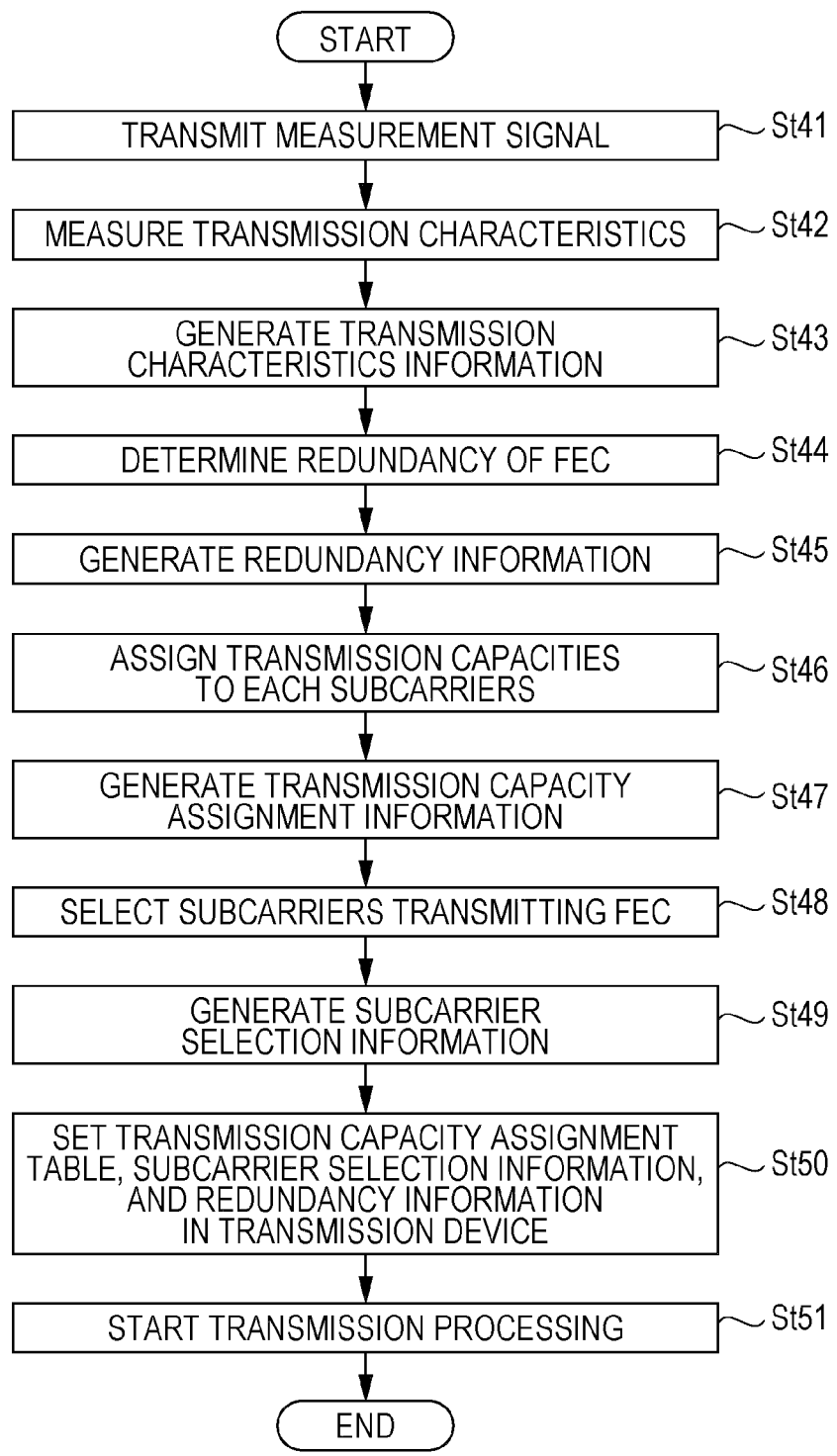
FIG. 18 illustrates the flow of a transmission method according to another embodiment.

FIG. 18 illustrates the flow of a transmission method according to this embodiment. In FIG. 18, St41 to St43, St46 to St49, and St51 are the same as St1 to St7 and St9 in FIG. 13, respectively, and therefore the description is omitted.

When the transmission characteristics information 70 is generated (St43), then the redundancy determination section 14 reads the transmission characteristics information 70 from the storage unit 12, and determines the redundancy of the FEC code depending on the transmission characteristics of the subcarriers #1 to #n (St44). Thereby, the amount of data of the FEC code is determined. Then, the redundancy determination section 14 generates the redundancy information 73 depending on the determined redundancy (St45). The generated redundancy information 73 is stored in the storage unit 12.

The communication processing unit 13 sends and sets the transmission capacity assignment information 71 in the storage unit 12, the subcarrier selection information 72, and the redundancy information 73 in the transmission device 2a or 2b (St50). According to this embodiment, since the amount of data of the FEC code is determined depending on the transmission characteristics of subcarriers, the error correction capability of the FEC code is appropriately adjusted. This suppresses the data losses during transmission and so forth to improve the transmission efficiency. Moreover, according to this embodiment, subcarriers for transmitting the FEC code are selected depending on the determined amount of data of the FEC code and the transmission capacities, and therefore the transmission efficiency improves as in the embodiment described earlier.

Additionally, as described above, the transmission device 2a or 2b assigns transmission capacities depending on the transmission characteristics to the plurality of subcarriers #1 to #n and superimposes and transmits the user data and the FEC code on the plurality of subcarriers #1 to #n, in accordance with the DMT scheme. Accordingly, it becomes possible to effectively utilize the frequency bands of the optical modules (the optical-to-electrical conversion unit 41 and the electrical-to-optical conversion unit 31) of the transmission device 2a or 2b and to expand the transmission rate. For example, it is theoretically possible to realize transmission at a transmission rate more than 40 Gbit/s by using optical modules of 10 Gbit/s.

The optical modules make up a large proportion of the entire cost of the transmission device 2a or 2b. Accordingly, achieving a high transmission rate by using optical modules each having a low transmission rate is effective in terms of cost. Note that while the transmission device 2a or 2b uses the optical fiber 9 as the transmission path, the transmission path is not limited to this and metal (metal line) may be used as in an asymmetric digital subscriber line (ADSL).

While the transmission control device 1 is provided independently of the transmission device 2a or 2b in the embodiments described hereinbefore, the transmission control device 1 is not limited to this and may be included in the transmission device 2a or 2b. In this case, the transmission control device 1 may perform intra-device communication with the sending unit 3 and the receiving unit 4 in the transmission device 2a or 2b to which the transmission device 1 is included, by using a wiring board and so on, for example, and perform communication with the sending unit 3 and the receiving unit 4 in the other transmission device 2b or 2a through the optical fiber 9.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission control device, comprising:
   a subcarrier selector configured to:
   select one or more subcarriers for transmitting an error correction code for correcting data and select one or more subcarriers different from the subcarriers selected for the error correction code to transmit the data, from a plurality of subcarriers having different transmission capacities,
   the selecting of the subcarriers performed in accordance with an amount of data of the error correction code and transmission capacities assigned to the plurality of subcarriers.

2. The transmission control device according to claim 1, wherein the subcarrier selector selects one or more subcarriers for which a remainder of transmission capacities of the assigned transmission capacities is smaller than a given value when the error correction code is transmitted, among the plurality of subcarriers.

3. The transmission control device according to claim 2, wherein if one or more subcarriers for which the remainder of the transmission capacities is smaller than the given value when the error correction code is transmitted do not exist, one or more subcarriers for which the remainder of the transmission capacities is minimized when the error correction code is transmitted are selected among the plurality of subcarriers.

4. The transmission control device according to claim 1, wherein one or more subcarriers for which a remainder of transmission capacities of the assigned transmission capacities is minimized when the error correction code is transmitted are selected among the plurality of subcarriers.

5. The transmission control device according to claim 1, further comprising a determiner configured to determine the amount of data of the error correction code depending on transmission characteristics of the plurality of subcarriers.

6. The transmission control device according to claim 1, wherein the transmission capacities are respectively assigned to the plurality of subcarriers depending on transmission characteristics of the plurality of subcarriers.

7. A transmission system, comprising:
   a transmission control device including a subcarrier selector configured to:
   select one or more subcarriers for transmitting an error correction code for correcting data and select one or more subcarriers different from the subcarriers selected for the error correction code to transmit the data, from a plurality of subcarriers having different transmission capacities,
   the selecting of the subcarriers performed in accordance with an amount of data of the error correction code and transmission capacities assigned to the plurality of subcarriers; and
   a transmission device configured to superimpose and transmit the data and the error correction code on the plurality of subcarriers, in accordance with selection performed by the subcarrier selector.

8. A transmission method, comprising:
   selecting one or more subcarriers for transmitting an error correction code for correcting data and select one or more subcarriers different from the subcarriers selected for the error correction code to transmit the data, from a plurality of subcarriers having different transmission capacities,
   the selecting of the subcarriers performed in accordance with an amount of data of the error correction code and transmission capacities assigned to the plurality of subcarriers; and
   superimposing and transmitting the data and the error correction code on the plurality of subcarriers in accordance with the selecting.

9. The transmission method according to claim 8, wherein, in the selecting of one or more subcarriers for transmitting the error correction code, one or more subcarriers for which a remainder of transmission capacities of the assigned transmission capacities is smaller than a given value when the error correction code is transmitted are selected among the plurality of subcarriers.

10. The transmission method according to claim 9, wherein, in the selecting of one or more subcarriers for transmitting the error correction code, if one or more subcarriers for which the remainder of the transmission capacities is smaller than the given value when the error correction code is transmitted do not exist, one or more subcarriers for which the remainder of the transmission capacities is minimized when the error correction code is transmitted are selected among the plurality of subcarriers.

11. The transmission method according to claim 8, wherein, in the selecting of one or more subcarriers for transmitting the error correction code, one or more subcarriers for which a remainder of transmission capacities of the assigned transmission capacities is minimized when the error correction code is transmitted are selected among the plurality of subcarriers.

12. The transmission method according to claim 8, wherein the amount of data of the error correction code is determined depending on transmission characteristics of the plurality of subcarriers.

13. The transmission method according to claim 8, wherein, in assignment of the transmission capacities to the plurality of subcarriers, the transmission capacities are respectively assigned to the plurality of subcarriers depending on transmission characteristics of the plurality of subcarriers.

* * * * *